United States Patent
Maeda et al.

(10) Patent No.: US 9,692,531 B2
(45) Date of Patent: Jun. 27, 2017

(54) METHOD AND SYSTEM OF MEASURING COMMUNICATION QUALITY

(71) Applicant: SoftBank Corp., Tokyo (JP)

(72) Inventors: Daisuke Maeda, Tokyo (JP); Liang Zhang, Tokyo (JP); Takao Okamawari, Tokyo (JP); Teruya Fujii, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 14/911,519

(22) PCT Filed: Feb. 2, 2015

(86) PCT No.: PCT/JP2015/052838
§ 371 (c)(1),
(2) Date: Feb. 11, 2016

(87) PCT Pub. No.: WO2016/125233
PCT Pub. Date: Aug. 11, 2016

(65) Prior Publication Data
US 2016/0365934 A1    Dec. 15, 2016

(51) Int. Cl.
*H04W 24/08*   (2009.01)
*H04B 17/309*  (2015.01)
(Continued)

(52) U.S. Cl.
CPC .......... *H04B 17/309* (2015.01); *H04W 24/08* (2013.01); *H04W 24/10* (2013.01); *H04W 88/02* (2013.01)

(58) Field of Classification Search
CPC ... H04B 1/3838; H04B 17/309; H04W 24/08; H04W 24/10; H04W 36/00; H04W 28/18;
(Continued)

(56) References Cited

U.S. PATENT DOCUMENTS 8,798,664 B2 *   8/2014   Yun .................... H04B 1/3838
                                                370/310
2006/0182065 A1   8/2006   Petrovic et al.
(Continued)

FOREIGN PATENT DOCUMENTS

| JP | 2007-151158 A | 6/2007 |
|----|---------------|--------|
| JP | 2013-520886 A | 6/2013 |
| WO | WO 2006/063642 A1 | 6/2006 |

OTHER PUBLICATIONS

International Telecommunication Union, "Series P: Telephone Transmission Quality, Telephone Installations, Local Line Networks—Methods for objective and subjective assessment of quality," ITU-T Recommendation p. 862, Feb. 2001.
(Continued)

*Primary Examiner* — Thanh Le
(74) *Attorney, Agent, or Firm* — Muirhead and Saturnelli, LLC

(57) ABSTRACT

Methods and systems of measuring communication quality are provided, by which measurement schedules of communication quality can be managed and controlled easily. A plural measurement-time slot is set with respect to a communication line used for communication quality measurements between a plural communication terminal apparatus via a mobile communication network, wherein each measurement-time slot has a time corresponding to one measurement of communication quality and the plural measurement-time slot is continuously arranged at a predetermined period, and a plural measurement schedule for measuring communication quality in each of communications with the plural communication terminal apparatus to the plural measurement-time slot. Information of the measurement schedule for each of the plural communication terminal apparatus is delivered to each communication terminal apparatus, and a communication for the communication quality measure-
(Continued)

ment with the communication terminal apparatus corresponding to the measurement schedule via the communication line is performed when the time of measurement schedule comes.

16 Claims, 8 Drawing Sheets

(51) Int. Cl.
  *H04W 24/10* (2009.01)
  *H04W 88/02* (2009.01)
(58) Field of Classification Search
  CPC ............... H04W 28/22; H04W 52/343; H04W 72/1226; H04W 72/1242; H04W 72/1284; H04W 92/12; H04W 52/146; H04W 36/18; H04L 47/12; H04L 47/14; H04L 47/245
  See application file for complete search history.

(56) References Cited

U.S. PATENT DOCUMENTS

2007/0226701 A1* 9/2007 Suonvieri ............. H04L 41/044
 717/128
2012/0315949 A1 12/2012 Zhang et al.
2013/0310105 A1* 11/2013 Sagae ................. H04W 52/367
 455/522

OTHER PUBLICATIONS

International Telecommunication Union, "Series P: Terminals and Subjective and Objective Assessment Methods—Methods for objective and subjective assessment of speech quality," Recommendation ITU-T p.863, Jan. 2011.

* cited by examiner

METHOD AND SYSTEM OF MEASURING COMMUNICATION QUALITY

TECHNICAL FIELD

The present invention relates to methods and systems of measuring quality of communication via a mobile communication network.

BACKGROUND ART

A method of measuring quality of communication by communicating between a server such as an automatic voice response apparatus and a communication terminal apparatus such as a mobile telephone via a mobile communication network at a predetermined given measurement time is conventionally known.

As an index value of communication quality, for example, a MOS (Mean Opinion Scores) value indicating voice quality in a voice communication is also known, which is standardized in Non-Patent Literature 1, Non-Patent Literature 2 and the like. This MOS value is a computed value corresponding to an average value of scores on five-grade evaluation by a large number of persons based on comparison results between a voice to be evaluated and a voice of a reference sound source. In Non-Patent Literature 1 and Non-Patent Literature 2, international standard methods of mechanically realizing the foregoing computation of MOS values are described.

CITATION LIST

Non-Patent Literature

Non-Patent Literature 1: "Perceptual evaluation of speech quality (PESQ): An objective method for end-to-end speech quality assessment of narrow-band telephone networks and speech codecs", SERIES P: TELEPHONE TRANSMISSION QUALITY, TELEPHONE INSTALLATIONS, LOCAL LINE NETWORKS, Methods for objective and subjective assessment of quality, TELECOMMUNICATION STANDARDIZATION SECTOR OF ITU, ITU-T Recommendation P. 862 (February 2001).

Non-Patent Literature 2: "Perceptual objective listening quality assessment", SERIES P: TERMINAL S AND SUBJECTIVE AND OBJECTIVE ASSESSMENT METHODS, Methods for objective and subjective assessment of speech quality, TELECOMMUNICATION STANDARDIZATION SECTOR OF ITU, ITU-T Recommendation P. 863 (January 2011).

SUMMARY OF INVENTION

Technical Problem

In the foregoing method, there are fears that the communication between the server for communication quality measurements and the communication terminal apparatus is concentrated in a specified time period and the communications with the server for communication quality measurements are conflicted between two or more communication terminal apparatuses.

Furthermore, it is considered that a measurement schedule of designating a measurement time for communication quality measurement is assigned to the communication terminal apparatus and information of the measurement schedule is delivered to each of the server and the communication terminal apparatus in advance. In this case, if the delivery of the measurement schedule is failed, the measurement of communication quality is not performed. Therefore, there is a fear that, in case of re-setting another measurement schedule of newly designating a measurement time for communication quality measurement with respect to the measurement schedule which has been unsuccessfully delivered, the reset measurement schedule of communication quality measurement and a measurement schedule of communication quality measurement in another communication terminal apparatus.

Solution to Problem

A method of measuring communication quality according to an aspect of the present invention includes setting two or more measurement-time slots with respect to a communication line used for communication quality measurements between two or more communication terminal apparatuses via a mobile communication network, wherein each of the two or more measurement-time slots has a time corresponding to one measurement of communication quality and the two or more measurement-time slots are continuously arranged at a predetermined period; assigning two or more measurement schedules for measuring communication quality in each of communications with the two or more communication terminal apparatuses to the two or more measurement-time slots; delivering information of the measurement schedule for each of the two or more communication terminal apparatuses to each of the communication terminal apparatuses; and performing a communication for the communication quality measurement with the communication terminal apparatus corresponding to the measurement schedule via the communication line when the time of measurement schedule comes.

The foregoing method may further include presetting a measurement-time slot for re-assigning the measurement schedule to a part of the forgoing two or more measurement-time slots; re-assigning the measurement schedule for the communication terminal apparatus to the measurement-time slot for re-assigning when the delivery of the foregoing measurement schedule information is failed without delivering the measurement schedule information to the communication terminal apparatus by the time of measurement schedule; and delivering information of the re-assigned measurement schedule to the communication terminal apparatus to which the measurement schedule information is failed to deliver.

Furthermore, the foregoing method may include setting two or more measurement-time slots with respect to each of two or more communication lines used for communication quality measurements between two or more communication terminal apparatuses via the mobile communication network, wherein each of the two or more measurement-time slots has a time corresponding to one measurement of communication quality and the two or more measurement-time slots are continuously arranged at a predetermined period; assigning two or more measurement schedules for measuring communication quality in each of communications with the two or more communication terminal apparatuses to the two or more measurement-time slots in a part of the two or more communication lines; re-assigning the measurement schedule for the communication terminal apparatus to the measurement-time slot for re-assigning in other part of the two or more communication lines when the delivery of the foregoing measurement schedule information is failed without delivering the measurement schedule information to the communication terminal apparatus by the time of measurement schedule; and delivering information of the re-assigned measurement schedule information to the communication terminal apparatus to which the measurement schedule information is failed to deliver.

Moreover, the foregoing method may include assigning the measurement schedules for the two or more communication terminal apparatuses to the two or more measurement-time slots repeatedly a plurality of times in the same order as the two or more communication terminal apparatus.

Furthermore, in the forgoing method, the measurement schedule for the communication terminal apparatus may be shifted so as to be assigned to distinct measurement-time slot at each predetermined period.

A system of measuring communication quality according to another aspect of the present invention comprises means of setting two or more measurement-time slots with respect to a communication line used for communication quality measurements between two or more communication terminal apparatuses via a mobile communication network, wherein each of the two or more measurement-time slots has a time corresponding to one measurement of communication quality and the two or more measurement-time slots are continuously arranged at a predetermined period; means of assigning two or more measurement schedules for measuring communication quality in each of communications with the two or more communication terminal apparatuses to the two or more measurement-time slots; means of delivering information of the measurement schedule for each of the two or more communication terminal apparatuses to each of the communication terminal apparatuses; and means of performing a communication for the communication quality measurement with the communication terminal apparatus corresponding to the measurement schedule via the communication line when the time of measurement schedule comes.

The foregoing system may comprise means of presetting a measurement-time slot for re-assigning the measurement schedule to a part of the forgoing two or more measurement-time slots; means of re-assigning the measurement schedule for the communication terminal apparatus to the measurement-time slot for re-assigning when the delivery of the foregoing measurement schedule information is failed without delivering the measurement schedule information to the communication terminal apparatus by the time of measurement schedule; and means of delivering information of the re-assigned measurement schedule to the communication terminal apparatus to which the measurement schedule information is failed to deliver.

Furthermore, the foregoing system may comprise means of setting two or more measurement-time slots with respect to each of two or more communication lines used for communication quality measurements between two or more communication terminal apparatuses via the mobile communication network, wherein each of the two or more measurement-time slots has a time corresponding to one measurement of communication quality and the two or more measurement-time slots are continuously arranged at a predetermined period; means of assigning two or more measurement schedules for measuring communication quality in each of communications with the two or more communication terminal apparatuses to the two or more measurement-time slots in a part of the two or more communication lines; means of re-assigning the measurement schedule for the communication terminal apparatus to the measurement-time slot for re-assigning in other part of the two or more communication lines when the delivery of the foregoing measurement schedule information is failed without delivering the measurement schedule information to the communication terminal apparatus by the time of measurement schedule; and means of delivering information of the re-assigned measurement schedule to the communication terminal apparatus to which the measurement schedule information is failed to deliver; and means of delivering information of the re-assigned measurement schedule to the communication terminal apparatus to which the measurement schedule information is failed to deliver.

Moreover, the foregoing system may comprise means of assigning the measurement schedules for the two or more communication terminal apparatuses to the two or more measurement-time slots repeatedly a plurality of times in the same order as the two or more communication terminal apparatus.

Furthermore, in the forgoing system, the measurement schedule for the communication terminal apparatus may be shifted so as to be assigned to distinct measurement-time slot at each predetermined period.

Advantageous Effects of Invention

According to the present invention, it is capable of providing methods and systems of measuring communication quality by which measurement schedules of communication quality can be managed and controlled easily.

DESCRIPTION OF EMBODIMENTS

Hereinafter, embodiments of the present invention are described with reference to the drawings.

Figure 1:
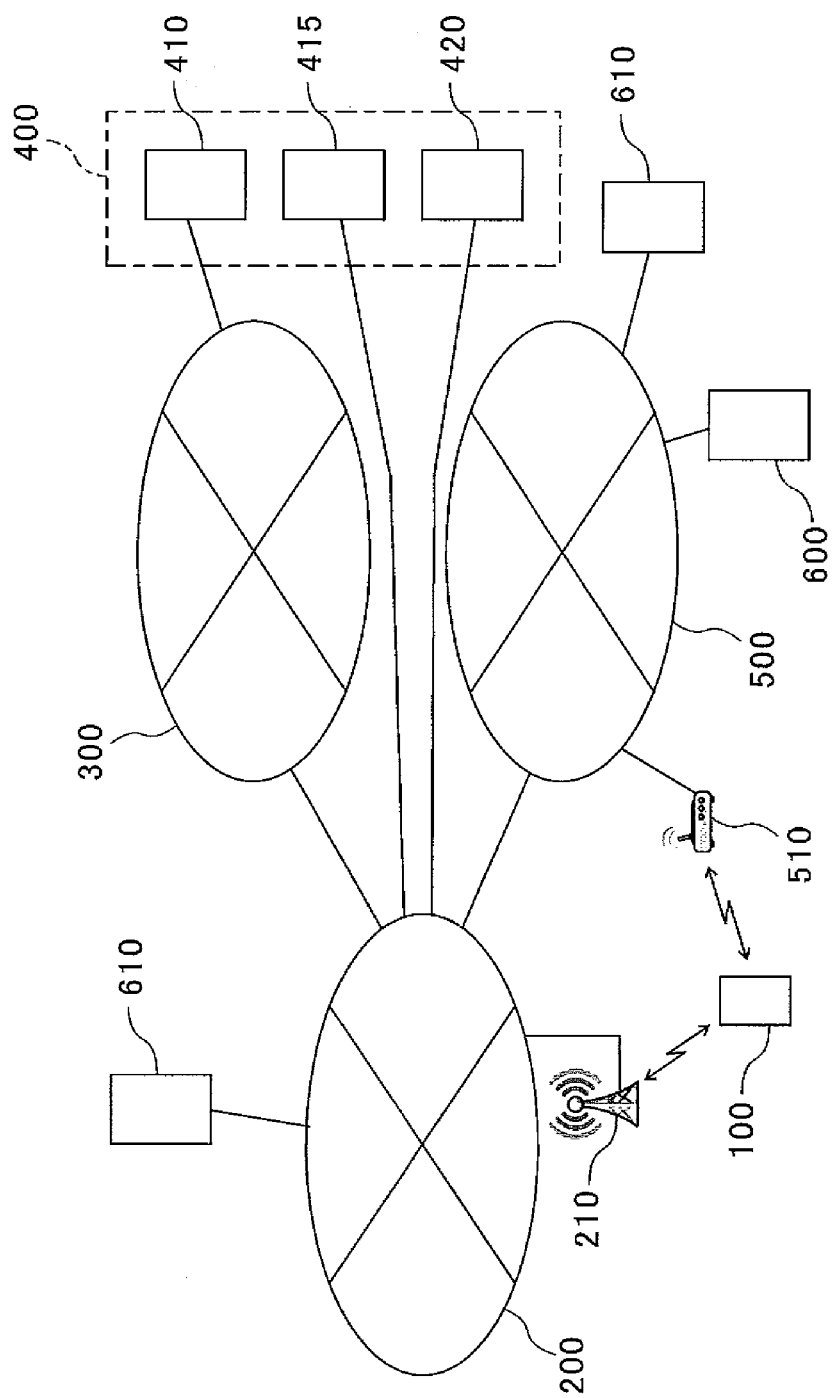
FIG. 1 is a schematic diagram showing one example of main part configuration of an overall communication system with a communication quality measurement system according to an embodiment of the present invention.

FIG. 1 is a schematic diagram showing one example of main part configuration of an overall communication system with a communication quality measurement system according to an embodiment of the present invention. In FIG. 1, the communication system of this embodiment includes a communication terminal apparatus 100 capable of being used by a user, and a communication quality measurement system 400 of performing a process relating to communication quality evaluation for a voice communication and/or a data communications via a mobile communication network (mobile telephone network) 200 by using the communication terminal apparatus 100. The communication quality measurement system 400 may be configured with a single server or a network apparatus, or may be configured by combining with a plurality of servers and/or network apparatuses.

The communication quality measurement system 400 exemplified in FIG. 1 is provided with an automatic voice response apparatus 410 and a delivery and analysis server 420 being a first server, as network-side communication apparatuses. The communication quality measurement system 400 may be provided with a data communication service providing server (hereinafter called as "data communication server") 415 being a second server. The automatic voice response apparatus 410 and data communication server 415 are network-side communication apparatuses (network apparatuses) capable of communicating with the communication terminal apparatus 100 and recording a predetermined network-side communication log.

The communication terminal apparatus 100 is capable of performing a voice communication with the automatic voice response apparatus 410 of communication quality measurement system 400 and/or other communication terminal apparatus etc. via a circuit switched network of the mobile communication network 200 including a base station 210 or via the circuit switched network and a fixed-telephone network 300.

Furthermore, the communication terminal apparatus 100 is capable of transmitting a measurement data of terminal-side (hereinafter called as "terminal-side measurement data) including communication log information used for communication quality measurements to the delivery and analysis server 420 and/or receiving information delivery of measurement condition such as a measurement schedule, a measurement contents or the like from the delivery and analysis server 420, via the mobile communication network 200.

Moreover, the communication terminal apparatus 100 is capable of performing a voice communication by a VoIP (Voice over Internet Protocol), a VoLTE (Voice over LTE) or the like, performing a Web communication, a streaming or the like and/or performing various data communications, with the data communication server 415 and/or other communication terminal apparatuses via a packet switching network of the mobile communication network 200 or via a packet switching network and the Internet 500.

Further, the communication terminal apparatus 100 is capable of accessing the Internet 500 via the foregoing mobile communication network 200 including the base station 210 or via an access-point apparatus 510 of a wireless LAN such as WiFi (Wireless Fidelity) and so on, and transceiving various data to and from the delivery and analysis server 420 and/or downloading contents such as music and so on from a contents providing server 600.

The communication terminal apparatus 100 is, for example, a tablet PC or a mobile communication terminal capable of performing a voice communication such as a mobile telephone, a smartphone, a PHS or the like, and capable of performing a voice communication and/or a data communication with a communication destination via the mobile communication network 200 that includes a base station being as a wireless relaying apparatus, switching equipment or the like.

For example, when existing in a cell being as a wireless communication area of the mobile communication network 200, the communication terminal apparatus 100 is capable of performing a voice communication with a communication terminal apparatus such as a tablet PC, a mobile communication terminal such as a mobile telephone, a smartphone, a PHS, etc. which exists in a cell of other mobile communication network.

Further, when exiting in a cell of the mobile communication network 200, the communication terminal apparatus 100 is capable of performing a voice communication with the automatic voice response apparatus 410 being as a voice communication destination of the communication quality measurement system 400 via the fixed-telephone network 300 and/or performing a data communication (including a VoIP or VoLTE call) with the data communication server 415 and/or the delivery and analysis server 420 of the communication quality measurement system 400 via the Internet 500.

In the description herein, the foregoing cell of the mobile communication network 200 is, for example, any one of various cells that are different in size between themselves, such as a macro cell, a micro cell, a femto cell, a pico cell or the like.

The communication terminal apparatus 100 is configured with, for example, a wireless signal processing section including an antenna, a transmitting amplifier, a receiving amplifier, a communication chip set, etc., a baseband signal processing section, an application execution management section, a voice input device including a small-size microphone, a voice output device including a speaker, a receiver, a vibration generator or the like, a display section such as an LCD being as display means, a main controller and so on. Furthermore, the communication terminal apparatus 100 includes a GPS receiving section that acquires information on its own current location by using the GPS (Global Positioning System), being as current location acquiring means. The communication terminal apparatus 100 may include an imaging section configured with a camera device such as a CCD, a CMOS device or the like, and an attitude detecting section configured with a gyro sensor, an acceleration sensor, a magnetic sensor or the like.

The main controller is configured with, for example, a microprocessor such as an MPU (Micro Processing Unit) and memories such as a RAM, a ROM etc., and controls respective sections based on a predetermined control program implemented in advance. For example, by executing the predetermined control program, the main controller is capable of performing a process of a voice communication with the automatic voice response apparatus 410 via the mobile communication network 200 and the fixed-telephone network 300 and a control of the voice communication, performing a process of extracting a received voice data of test voice signal based on the received signal from the automatic voice response apparatus 410 as a received voice data (digital signal) encoded by a predetermined compressing/coding scheme, performing a process of transmitting and receiving of various data to and from the server (delivery and analysis server 420, data communication server 415) via the mobile communication network 200 and the Internet 500 and a control of the transmitting and receiving, performing a download of contents such as music from the contents providing server 600 and a control of the download, performing a process of determining presence or absence of an abnormal disconnection, and so on.

The foregoing compressing/coding scheme for the received voice data includes, for example, GSM (registered trademark) (Global System for Mobile communications) AMR (Adaptive Multi-Rate) Codec/ACELP (Algebraic Code Excited Linear Prediction) compression (bit rate: 4.75 [kbps]-12.2 [kbps]). A file of the received voice data (digital) compressed and encoded in this way is capable of having a data amount of about one-tenth of a recorded audio file (e.g. WAV format file) obtained from the received voice data.

Moreover, the communication terminal apparatus 100 is capable of executing various application programs on a native environment of the main controller and/or executing various application programs on a virtual environment established by the application executing management section. In the description herein, the "application" (hereinafter abbreviated as "app" as appropriate) means a software capable of being applied to each of various uses such as a telephone, recording, browser, camera, search, mail, information delivery, calendar, clock, music playback, map display, data folder, message communication, video playback and so on, as well as a communication quality measurement processing, and is also called "application software". The "application" is an aggregation of files of executive programs developed with various computer languages and files of setting information, image, etc. that are used and/or referred when executing the program or in other timing.

The application execution management section manages, for example, program modules and libraries that are used for executing the applications. Moreover, the application execution management section establishes a framework (for example, an Android framework, an iOS framework, etc.) or a virtual execution environment (virtual machine) such as a Dalvik (registered trademark) VM, a Java VM, etc., which are used for any one, two or more than two of plural kinds of applications such as an Android (registered trademark) application, an iOS (registered trademark) application, a Windows (registered trademark) application, a Java (registered trademark) application and so on. The application execution management section is configured to have a multitasking function so as to execute a plurality of applications in parallel.

The delivery and analysis server 420 stores information on measurement condition such as a measurement schedule designating time of executing a communication quality measurement, etc. and/or information on measurement contents designating a type of index value of communication quality to be measured, and performs a management processing such as new registration, modification, deletion, etc. of the information on measurement condition and/or the measurement contents.

The delivery and analysis server 420 functions as a means of delivering information including the measurement condition and/or measurement contents of communication quality to the communication terminal apparatus 100 capable of communicating via the mobile communication network 200. Moreover, the delivery and analysis server 420 functions also as a means of delivering information including the measurement condition and/or measurement contents of communication quality to each of the automatic voice response apparatus 410 and the data communication server 415.

For example, the delivery and analysis server 420 is capable of delivering information on measurement condition such as the latest measurement schedule to the communication terminal apparatus 100 via the mobile communication network 200, at a predetermined timing that is set in advance or an arbitrary timing. In this case, the communication terminal apparatus 100 performs a communication with the automatic voice response apparatus 410 or the data communication server 415 via the mobile communication network 200, at the predetermined timing that satisfies the measurement condition received from the delivery and analysis server 420.

Furthermore, the delivery and analysis server 420 is capable of delivering information including measurement condition such as the latest measurement schedule to each of the automatic voice response apparatus 410 and the data communication server 415 via the mobile communication network 200 or other leased line, at a predetermined timing that is set in advance or an arbitrary timing. In this case, the automatic voice response apparatus 410 and the data communication server 415 perform a communication with the communication terminal apparatus 100 via the mobile communication network 200, at the predetermined timing that satisfies the measurement condition received from the delivery and analysis server 420.

The foregoing measurement condition may be other condition such as a measurement area designating a location of the communication terminal apparatus when performing a communication quality measurement, a moving speed in measurement designating a moving speed of the communication terminal apparatus when performing the communication quality measurement or the like, as well as the measurement schedule designating time for performing the communication quality measurement. Moreover, together with the foregoing measurement condition, a measurement contents designating a type of the index value of communication quality to be measured may be delivered. In this description herein, the index value of communication quality may be at least one of a successful connection rate, a failed connection rate, an out-of-service rate, an airplane-mode rate, an apparatus-failure rate, a power-off rate, a value showing presence or absence of forcible disconnection (Call Drop) during communication, a value of voice quality showing an evaluation result of voice quality (MOS value described below) and an error rate (block error rate, bit error rate, packet loss rate, etc.) during communication of communication terminal apparatuses in the mobile communication network.

The foregoing measurement condition and measurement contents may be set based on various kinds of information. For example, the measurement condition may be set based on at least one of a communication history of the communication terminal apparatus 100, a type/model of the communication terminal apparatus 100, a current location (GPS position, area, serving cell, etc.) of the communication terminal apparatus 100, a time period (a weekday/holyday, day of week, early morning/daytime/nighttime), a moving speed (for example, low speed during moving on foot, high speed during moving by car, train or the like) of the communication terminal apparatus, information on a communications service provider of the mobile communication network 200 and communication quality (for example, receiving SINR) in the communication terminal apparatus 100. The system may be configured so as to have an automatic learning function capable of being updated by successively learning the measurement condition set in this way described above, and the measurement condition used in the immediately previous measurement may be preferentially delivered as the measurement condition used in the next measurement of communication quality.

The automatic voice response apparatus 410 is configured to be capable of communicating with the communication terminal apparatus 100 via the switching network of the mobile communication network 200 and the fixed-telephone network 300. Further, the automatic voice response apparatus 410 is configured to be capable of communicating with the delivery and analysis server 420 via the mobile communication network 200 or other leased line.

The automatic voice response apparatus 410 functions as a means of performing a voice communication with the communication terminal apparatus 100 via the mobile communication network 200 at the predetermined timing that satisfies the above-described measurement condition.

For example, the automatic voice response apparatus 410 performs an automatic voice response of transmitting a test signal for measurements of voice communication (for evaluation of voice communication) to the communication terminal apparatus 100, in response to an outgoing call of normal voice communication from the communication terminal apparatus 100 which is transmitted at a predetermined timing that satisfies the foregoing measurement condition.

The automatic voice response apparatus 410 may perform an automatic outgoing call of normal voice communication to the communication terminal apparatus 100 at the predetermined timing that satisfies the foregoing measurement condition and transmit a test signal for measurements of voice communication (for evaluation of voice communication) to the communication terminal apparatus 100 that responds to the automatic outgoing call.

The data communication server 415 is configured to be capable of communicating with the communication terminal apparatus 100 via the packet switching network of the mobile communication network 200, or via the packet switching network and the Internet 500. Furthermore, the data communication server 415 is configured to be capable of communicating with the delivery and analysis server 420 via the mobile communication network 200 or other leased line.

The data communication server 415 functions as a means of performing a data communication with the communication terminal apparatus 100 via the mobile communication network 200 at the predetermined timing that satisfies the foregoing measurement condition.

For example, the data communication server 415 performs an automatic voice response of transmitting a test signal for measurements of voice communication (for evaluation of voice communication) to the communication terminal apparatus 100, in response to an outgoing call of voice communication by VoIP, VoLTE, etc. from the communication terminal apparatus 100 transmitting at the foregoing predetermined timing. Moreover, the data communication server 415 also transmits a test data for measurements of communication quality in response to an acquisition request for the test data transmitted from the communication terminal apparatus 100 at the foregoing predetermined timing.

It is noted that the data communication server 415 may transmit the test signal for measurements of voice communication (for evaluation of voice communication) by VoIP, VoLTE, etc. or the test data for measurements of communication quality to the communication terminal apparatus 100 at a predetermined timing that satisfies the foregoing measurement condition, by a push-type communication to the communication terminal apparatus 100.

Moreover, the communication terminal apparatus 100 and the communication quality measurement server 420 are in a state of mutual time synchronization. For example, each of the communication terminal apparatus 100, automatic voice response apparatus 410 and data communication server 415 is capable of performing a time synchronization processing by communicating with an NTP (Network Time Protocol) server 610 connected to the mobile communication network 200 or the Internet 500. The time synchronization processing in each of the apparatuses and servers may be performed by receiving GPS signals or by other methods.

The delivery and analysis server 420 is configured to be capable of communicating with the communication terminal apparatus 100 via the packet switching network of the mobile communication network 200, or via the packet switching network and the Internet 500. Further, the delivery and analysis server 420 is also configured to be capable of communicating with the automatic voice response apparatus 410 and the data communication server 415 via the mobile communication network 200 or other leased line.

The delivery and analysis server 420 is capable of performing various processes relating to the evaluation of communication quality in a communication via the mobile communication network 200.

For example, the delivery and analysis server 420 functions as a means of acquiring at least one of a terminal-side measurement data including terminal-status log information at the predetermined timing that satisfies the foregoing measurement condition recorded in the communication terminal apparatus 100 and a measurement data of network side (hereinafter called as "network-side measurement data") including terminal-existing serving-base-station quality information corresponding to a communication at the predetermined timing.

Moreover, the delivery and analysis server 420 functions as a means of calculating an index value of communication quality in a communication via the mobile communication network 200, based on at least one of the terminal-side measurement data and the network-side measurement data.

Furthermore, the delivery and analysis server 420 functions as a means of setting two or more measurement-time slots with a time corresponding to one measurement of communication quality, which are continuously arranged at a predetermined period, with respect to a communication line used for communication quality measurements between two or more communication terminal apparatuses 100 via a mobile communication network 200. The delivery and analysis server 420 also functions as a means of assigning two or more measurement schedules for measuring communication quality in each of communications with the two or more communication terminal apparatuses 100 to the two or more measurement-time slots. The delivery and analysis server 420 also functions as a means of delivering information of the measurement schedule for each of the two or more communication terminal apparatuses 100 to each of the communication terminal apparatuses 100.

Moreover, the delivery and analysis server 420 functions as a means of presetting a measurement-time slot for re-assigning the measurement schedule to a part of the forgoing two or more measurement-time slots. The delivery and analysis server 420 also functions as a means of re-assigning the measurement schedule for the communication terminal apparatus 100 to an empty measurement-time slot in the measurement-time slot for re-assigning when the delivery of the foregoing measurement schedule information is failed without delivering the measurement schedule information to the communication terminal apparatus 100 by the time of measurement schedule. It is noted that the re-assignment of measurement schedule may be performed not only to the measurement-time slot for re-assigning, but also to an empty measurement-time slot. The delivery and analysis server 420 also functions as a means of delivering information of the re-assigned measurement schedule to the communication terminal apparatus 100 to which the measurement schedule information is failed to deliver.

Further, the delivery and analysis server 420 functions as a means of setting two or more measurement-time slots with a time corresponding to one measurement of communication quality, which are continuously arranged at a predetermined period, with respect to each of two or more communication lines used for communication quality measurements between two or more communication terminal apparatuses 100 via the mobile communication network 200. The delivery and analysis server 420 also functions as a means of assigning two or more measurement schedules for measuring communication quality in each of communications with the two or more communication terminal apparatuses 100 to the two or more measurement-time slots in a part of the two or more communication lines. The delivery and analysis server 420 also functions as a means of re-assigning the measurement schedule for the communication terminal apparatus 100 to the measurement-time slot for re-assigning in other part of the two or more communication lines when the delivery of the foregoing measurement schedule information is failed without delivering the measurement schedule information to the communication terminal apparatus 100 by the time of measurement schedule. The delivery and analysis server 420 also functions as a means of delivering information of the re-assigned measurement schedule to the communication terminal apparatus 100 to which the measurement schedule information is failed to deliver.

Each of the automatic voice response apparatus 410 and the data communication server 415 also functions as a means of performing a communication for the communication quality measurement with the communication terminal apparatus 100 corresponding to the measurement schedule via the communication line when the time of measurement schedule comes.

Table 1 is a list showing one example of the terminal-side measurement data capable of being obtained from the communication terminal apparatus 100.

TABLE 1

| Category | Item | Contents |
| --- | --- | --- |
| Measurement schedule | Measurement time | Starting time, Ending time |
|  | Measurement location | Latitude, Longitude |
|  | Schedule ID | Schedule management number |
| Terminal information | Terminal identification number (IMEI) | |
|  | Type/model of terminal | |
|  | Operating system (OS) | |
|  | Carrier information | |
|  | Telephone number | |
|  | Moving speed | |
| Measurement contents | Voice communication quality | Connection rate of voice communication, Voice quality |
|  | Data communication quality | Connection rate of data communication, Communication speed |
|  | Measurement direction | Outgoing from terminal, Incoming to terminal |
| Measurement result | Result of voice communication quality | Voice quality value, Recorded audio file, Connection history of voice communication |
|  | Result of data communication quality | Connection history of data communication, Throughput value |
|  | Terminal-status log information | (Refer to Table 2) |
|  | Terminal-existing serving-base-station quality information | (Refer to Table 3) |

In the description herein, the "recorded audio file" in Table 1 is a file created by recording a test voice signal including a test signal received from the automatic voice response apparatus 410 or the data communication server 415. The "voice quality value" in Table 1 is an evaluation value of voice quality such as a MOS (Mean Opinion Scores) value or the like calculated based on the recorded audio file and a sound source file of the test voice signal (refer to Non-Patent Literatures 1 and 2). In Table 1, the "connection rate of voice communication" is a value of successful connection count of voice communications divided by total connection count of performing voice communications, and the "connection rate of data communication" is a value of successful connection count of data communications divided by total connection count of performing data communications.

Table 2 is a list showing one example of the terminal-status log information in Table 1 included in the terminal-side measurement data. The terminal-status log information is recorded only in a predetermined time (for example, within two minutes) that includes time of the foregoing measurement schedule.

TABLE 2

| Item |
| --- |
| Call history |
| Setting of call waiting |
| Busy state |
| Setting of function mode |
| Setting of incoming rejection |
| Power-off |
| Out-of-service |
| Terminal freeze information |

Table 3 is a list showing one example of the terminal-existing serving-base-station quality information in Table 1, which is included in the terminal-side measurement data. This terminal-existing serving-base-station quality information is information relating to the terminal-existing serving-base station in a cell (serving cell) within which the communication terminal apparatus 100 exists when conducting the measurements, and is recorded only during a predetermined time (for example, time within two minutes) including the foregoing time of measurement schedule.

TABLE 3

| Category | Item |
| --- | --- |
| Basic information | Physical cell ID (PCI) |
| | Cell ID (CI) |
| | Tracking area code (TAC) |
| | Type of connection network |
| | Center frequency |
| | Frequency band |
| Radio channel quality information | Received signal strength indicator (RSSI) |
| | Reference signal received power (RSRP) |
| | Received signal code power (RSCP) |
| | Reference signal received quality (RSRQ) |
| | Energy per chip to noise radio (Ec/No) |
| | Block error rate (BLER) |
| | Channel quality indicator (CQI) |

Table 4 is a list showing one example of the network-side measurement data capable of being obtained from the automatic voice response apparatus 410 and the data communication server 415.

TABLE 4

| Category | Item | Contents |
| --- | --- | --- |
| Measurement schedule | Measurement time | Starting time, Ending time |
| | Schedule ID | Schedule management number |
| Network-side apparatus | Automatic voice response apparatus | Telephone number |
| | Server | IP address, server management number |
| Measurement contents | Voice communication quality | Connection rate of voice communication, Voice quality |
| | Data communication quality | Connection rate of data communication, Communication speed |
| | Measurement direction | Outgoing from terminal, Incoming to terminal |
| Network-side apparatus log information | (Refer to Table 5) | |

Table 5 is a list of one example showing the network-side apparatus log information in Table 4, which is included in the network-side measurement data. This network-side apparatus log information is recorded only during a predetermined time (for example, time within two minutes) including the foregoing time of measurement schedule.

TABLE 5

| Item |
| --- |
| Successful termination |
| Line busy |
| Forcible disconnection |
| Disconnection by destination |
| No-response from destination |
| Apparatus error signal |
| Line error |

Table 6 is a list showing one example of the index values of communication quality calculated by the delivery and analysis server 420. In the present embodiment herein, at least one of these index values of communication quality is calculated.

TABLE 6

| Index of communication quality | Definition |
| --- | --- |
| (Total) connection rate | Successful connection count/Total measurement count |
| (Total) failed connection rate | Failed connection count/Total measurement count |
| Failure rate of connection (caused by network-side) | Failed connection count caused by network-side/ (Successful connection count + Failed connection count caused by network-side) |
| Out-of-service rate | Count of out-of-service of terminal/Total measurement count |
| Airplane-mode rate | Count of airplane mode of terminal/Total measurement count |
| Apparatus-failure rate | Count of apparatus failure/Total measurement count |
| Power-off rate | Count of power-off/Total measurement count |
| Presence or absence of forcible disconnection | Value indicating presence or absence of forcible disconnection (Call Drop) during communication |
| Voice quality value | MOS value indicating evaluation result of voice quality |
| Error rate | Error rate during communication (block error rate, bit error rate, packet loss rate, etc.) |

The foregoing index values of communication quality may be calculated with respect to a communication in any one direction of outgoing from the communication terminal apparatus 100 and incoming to the communication terminal apparatus 100, or may be calculated with respect to communications in both directions of outgoing from the communication terminal apparatus 100 and incoming to the communication terminal apparatus 100. The delivery of measurement condition, the communication via mobile communication network 200, and the acquisition of at least one of the terminal-side measurement data and network-side measurement data, which are described above, may be performed with respect to a plurality of communication terminal apparatuses 100, and the index value of communication quality may be calculated with respect to communications with the plurality of communication terminal apparatuses 100 via mobile communication network 200.

For example, each of the above-mentioned automatic voice response apparatus 410, data communication server 415 and delivery and analysis server 420 is configured by using hardwares such as a computer apparatus having an MPU, memories, etc., an external communication interface apparatus, a decoder being as necessary decoding means, and may be capable of performing various processes for communication quality evaluation by executing a predetermined program. When receiving from the communication terminal apparatus 100 a file of received voice data (digital signal) encoded by a predetermined coding scheme, the foregoing decoder can decode the received voice data using a predetermined decoding algorithm and generate a received voice signal (analog signal) that is a test voice signal received from the communication terminal apparatus 100.

It is noted herein that the foregoing delivery and analysis server 420 may be configured with a plurality of servers. For example, a delivery server of delivering the foregoing information including measurement condition and measurement contents and an analysis server of performing various processes relating to the evaluation of communication quality may be provided separately.

Some examples of communication quality measurements in the communication system according to the present embodiment will be then described.

Figure 2:
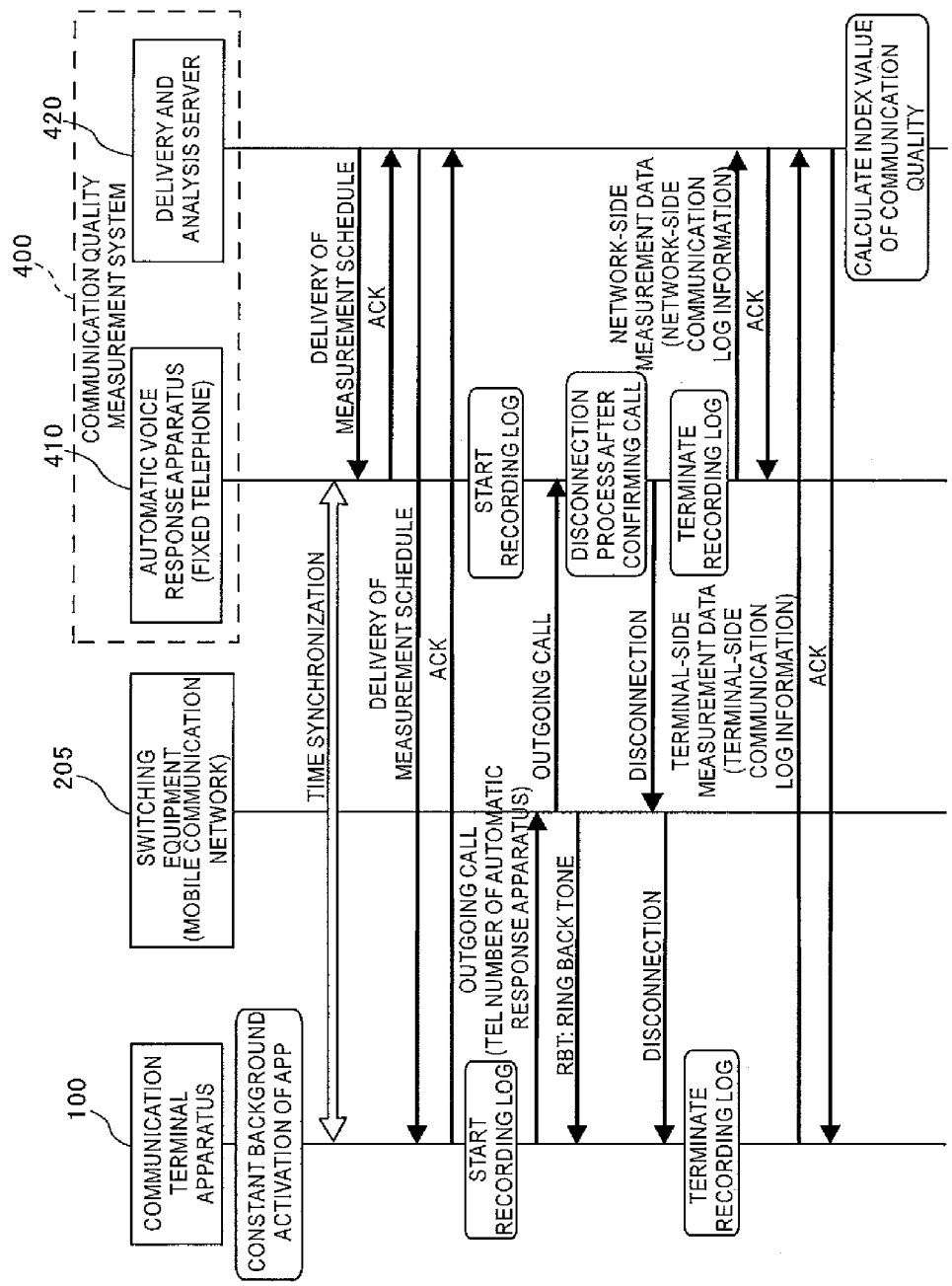
FIG. 2 is a sequence diagram showing one example of communication quality measurements for a voice communication in the direction of outgoing from a communication terminal apparatus in the communication system according to the present embodiment.

FIG. 2 is a sequence diagram showing one example of communication quality measurements for a voice communication in the direction of outgoing from a communication terminal apparatus 100 in the communication system according to the present embodiment. The present example is an example in which information including a measurement schedule that designates time for performing a communication quality measurement is delivered as measurement condition of the communication quality measurement.

In the example herein, a communication quality measurement app for performing a process of communication quality measurement is preinstalled in the communication terminal apparatus 100. The communication terminal apparatus 100 and automatic voice response apparatus 410 are mutually synchronized in time by using an NTP server, GPS signals, etc. Further, The communication terminal apparatus 100 is in a state of constant background operation with the communication quality measurement app activated in advance.

In FIG. 2, to begin with, the delivery and analysis server 420 transmits information of a predetermined measurement schedule as measurement condition designating a timing of communication quality measurement, to the communication terminal apparatus 100 and automatic voice response apparatus 410.

Table 7 shows one example of the information of measurement schedule transmitted from the delivery and analysis server 420. In the present example, 10:00 on Nov. 11, 2014 is designated as measurement time. This information of measurement schedule includes a schedule ID (schedule management number) for identifying and managing respective measurement schedule, and information of telephone number and type of the both of origination and destination for communication to measure a communication quality. As an option of measurement schedule, for example, information for designating an area in which a communication quality measurement is performed may be included. In this case, when the communication terminal apparatus 100 exists within the designated area, the communication quality measurement is performed at the timing when the designated measurement time comes.

TABLE 7

| Measurement time | Schedule ID | Origination | | Destination | | Option |
| --- | --- | --- | --- | --- | --- | --- |
| | | Telephone number | Type | Telephone number | Type | |
| Nov. 11, 2014 10:00:00 | 1 | 080*** | Mobile | 0120*** | Fixed | Area name |

The communication terminal apparatus 100 starts recording a communication log for measuring a predetermined communication quality when the timing reached near the designated measurement time (10:00 on Nov. 11, 2014)

comes, based on the information of measurement schedule received from the delivery and analysis server 420.

The automatic voice response apparatus 410 starts recording a communication log for measuring a predetermined communication quality when it comes to the timing reached near the measurement time (10:00 on Nov. 11, 2014) designated with the measurement schedule received from the delivery and analysis server 420. In the automatic voice response apparatus 410, the recording of communication log for communication quality measurement may be performed constantly.

The communication terminal apparatus 100 performs an automatic outgoing call for calling to the telephone number (0120******) of automatic voice response apparatus 410 designated as a destination on the aforementioned measurement schedule via switching equipment 205 of the mobile communication network 200 and the fixed-telephone network 300, when the foregoing predetermined measurement time (10:00 on Nov. 11, 2014) comes. When receiving the outgoing call from the communication terminal apparatus 100, the switching equipment 205 transmits a response of ringback tone to the communication terminal apparatus 100 and performs an outgoing call to the automatic voice response apparatus 410 via the fixed-telephone network 300 and mobile communication network 200. The telephone number of automatic voice response apparatus 410** may be preset in the communication quality measurement app.

When receiving the outgoing call from the switching equipment 205, the automatic voice response apparatus 410 performs an automatic disconnecting process after confirming the incoming call, transmits a disconnection signal to the communication terminal apparatus 100 via the switching equipment 205, and then, terminates recording the communication log. The network-side measurement data including the terminal-existing serving-base-station quality information recorded with the automatic voice response apparatus 410 is transmitted to the delivery and analysis server 420.

When receiving the disconnection signal from the switching equipment 205, the communication terminal apparatus 100 terminates recording the communication log. The terminal-side measurement data including the terminal-status log information recorded with the communication terminal apparatus 100 is transmitted to the delivery and analysis server 420. The disconnecting process of voice communication may be performed with the communication terminal apparatus 100, separating from the automatic voice response apparatus 410.

Table 8 shows one example of the terminal-side measurement data transmitted from the communication terminal apparatus 100 to the delivery and analysis server 420. In the present example, the terminal-side measurement data includes, in addition to a schedule ID, an outgoing time (10:00 on Nov. 11, 2014), a current location of the communication terminal apparatus 100, a moving speed, a telephone number of origination (self), a telephone number of destination, information on success or failure of connection and other information. Further, in the present example, as other information, a terminal-existing serving-base station information of the communication terminal apparatus 100, etc. is included. It is noted that the terminal-side measurement data is not limited to the example in Table 8 and may include one part or all of the various data indicated in the foregoing Tables 1 to 3.

TABLE 8

| Schedule ID | Outgoing time | Existing location | Moving speed | Origination (self) | Destination | Success or failure of connection | Others |
|---|---|---|---|---|---|---|---|
| 1 | Nov. 11, 2014 10:00:00 | Longitude/ Latitude (GPS) | 30 km/h | 080*** | 0120*** | Success | Terminal-existing serving-base-station information, etc. |

On the other hand, the automatic voice response apparatus 410 terminates recording the communication log after the automatic disconnecting process is performed by the communication terminal apparatus 100. This network-side measurement data including the terminal-existing serving-base-station quality information recorded with the automatic voice response apparatus 410 is transmitted to the delivery and analysis server 420.

Table 9 shows one example of the network-side measurement data transmitted from the automatic voice response apparatus 410 to the delivery and analysis server 420. In the present example, the network-side measurement data includes, in addition to a schedule ID, an incoming time (10:03 on Nov. 11, 2014), a telephone number of origination, a telephone number of destination (self), information on success or failure of connection and other information. Further, in the present example, as the other information, a signaling (PSTN/SS7 signal), etc. is included. It is noted that the network-side measurement data is not limited to the example in Table 9 and may include one part or all of the various data indicated in the foregoing Tables 4 and 5.

TABLE 9

| Schedule ID | Incoming time | Origination | Destination (self) | Success or failure of connection | Others |
|---|---|---|---|---|---|
| 1 | Nov. 11, 2014 10:00:03 | 080*** | 0120*** | Success | PSTN/SS7 signal (signaling information) |

The delivery and analysis server 420 performs a process of communication quality analysis when receiving the terminal-side measurement data from the communication terminal apparatus 100 and the network-side measurement data from the automatic voice response apparatus 410. In this communication quality analysis, for example, the terminal-side measurement data and the network-side measurement data having a same schedule ID (schedule management number) are collated, and an index of communication quality in the communication of outgoing call for communication quality measurement from the communication terminal apparatus is calculated. As the index value of communication quality calculated herein, for example, at least one of a connection rate, a total failed connection rate, a failure rate of connection (caused by network-side), an out-of-service rate, an airplane-mode rate, an apparatus-failure rate, a power-off rate, a value indicating presence or absence of forcible disconnection (Call Drop), a voice quality value (MOS value) indicating an evaluation result of voice quality and an error rate during communication (block error rate, bit error rate, packet loss rate, etc.) for voice communication, which are listed in the foregoing Table 6, may be exemplified.

As described above, according to the example in FIG. 2, the measurement schedule is delivered from the delivery and analysis server 420 to the communication terminal apparatus 100 and the automatic voice response apparatus 410, as the measurement condition of communication quality measurement for a voice communication transmitted from the communication terminal apparatus 100. Consequently, with respect to the voice communication transmitted from the communication terminal apparatus 100, the measurement schedule of communication quality measurement can be set or changed easily and optionally, and then, while various communication quality measurements can be performed flexibly, the communication quality can be measured with high accuracy. For example, a cause of communication failure can be identified by collating the terminal-status log information with the terminal-existing serving-base-station quality information. Further, by designating the information of measurement condition, a concentration of communication quality data for a specific location can be prevented and communication quality data can be obtained under the condition (during a high speed moving, in the location with weak electromagnetic waves, etc.) by which a mobile communications service provider can obtain the expected data.

Furthermore, according to the example in FIG. 2, it is enough for the communication terminal apparatus 100 to perform a process of recording communication log information during performing a communication for measuring communication quality in accordance with the measurement schedule received from the delivery and analysis server 420. Consequently, load of processing in the communication terminal apparatus 100 can be suppressed compared to a case of constantly recording communication log information in the communication terminal apparatus 100.

Figure 3:
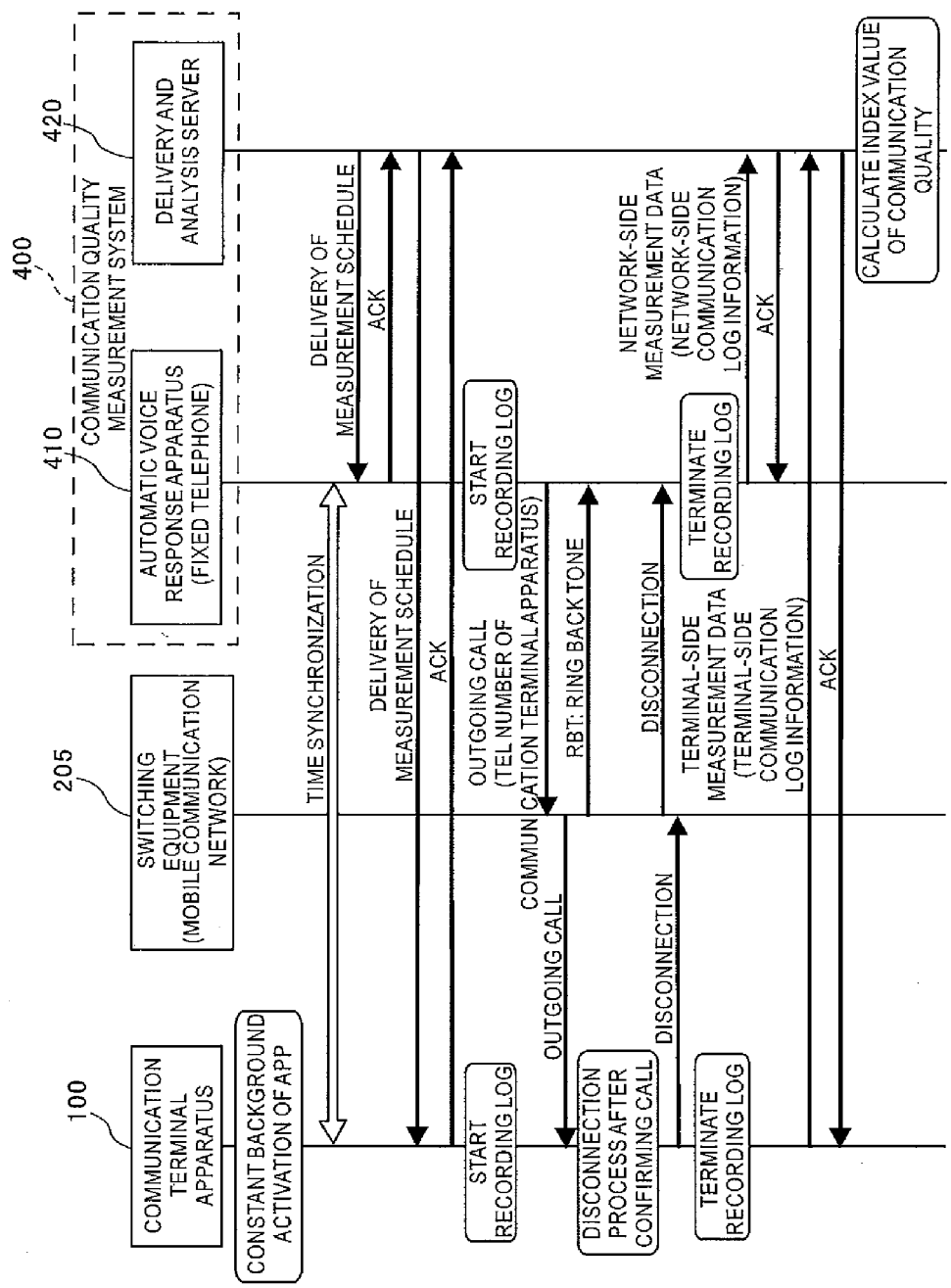
FIG. 3 is a sequence diagram showing one example of communication quality measurements for a voice communication in the direction of incoming to a communication terminal apparatus in the communication system according to the present embodiment.

FIG. 3 is a sequence diagram showing one example of communication quality measurements for a voice communication in the direction of incoming to the communication terminal apparatus 100 in the communication system according to the present embodiment. In the present example, a description of the same or substantially the same part as that of the aforementioned example in FIG. 2 will be omitted.

In FIG. 3, after the measurement schedule is delivered and the communication terminal apparatus 100 and the automatic voice response apparatus 410 start recording a communication log of communication quality measurement, when the foregoing predetermined measurement time (10:00 on Nov. 11, 2014) comes, the automatic voice response apparatus 410 starts recording a communication log for measuring a predetermined communication quality and performs an automatic outgoing call, via the mobile communication network 200 and the fixed-telephone network 300, to the telephone number (080********) of communication terminal apparatus 100 designated as a destination on the foregoing measurement schedule.

When it comes to the timing reached near the measurement time (10:00 on Nov. 11, 2014) designated with the measurement schedule received from the delivery and analysis server 420, the communication terminal apparatus 100 starts recording a communication log for measuring a predetermined communication quality.

When receiving a disconnection signal from the communication terminal apparatus 100 via the switching equipment 205, the automatic voice response apparatus 410 terminates recording the communication log. The network-side measurement data including the terminal-existing serving-base-station quality information recorded with the automatic voice response apparatus 410 is transmitted to the delivery and analysis server 420. The disconnecting process of voice communication may be performed with the automatic voice response apparatus 410, separating from the communication terminal apparatus 100.

On the other hand, when receiving the outgoing call from the switching equipment 205, the communication terminal apparatus 100 performs an automatic disconnecting process after confirming the incoming call, transmits a disconnection signal to the automatic voice response apparatus 410 via the switching equipment 205, and then, terminates recording the communication log. The terminal-side measurement data including the terminal-status log information recoded with the communication terminal apparatus 100 is transmitted to the delivery and analysis server 420.

As described above, according to the example in FIG. 3, the measurement schedule is delivered from the delivery and analysis server 420 to the communication terminal apparatus 100 and the automatic voice response apparatus 410, as the measurement condition of communication quality measurement for a voice communication received by the communication terminal apparatus 100. Consequently, with respect to the voice communication received by the communication terminal apparatus 100, the measurement schedule of communication quality measurement can be set or changed easily and optionally, and then, as is the case of example shown in FIG. 2, while various communication quality measurements can be performed flexibly, the communication quality can be measured with high accuracy.

Figure 4:
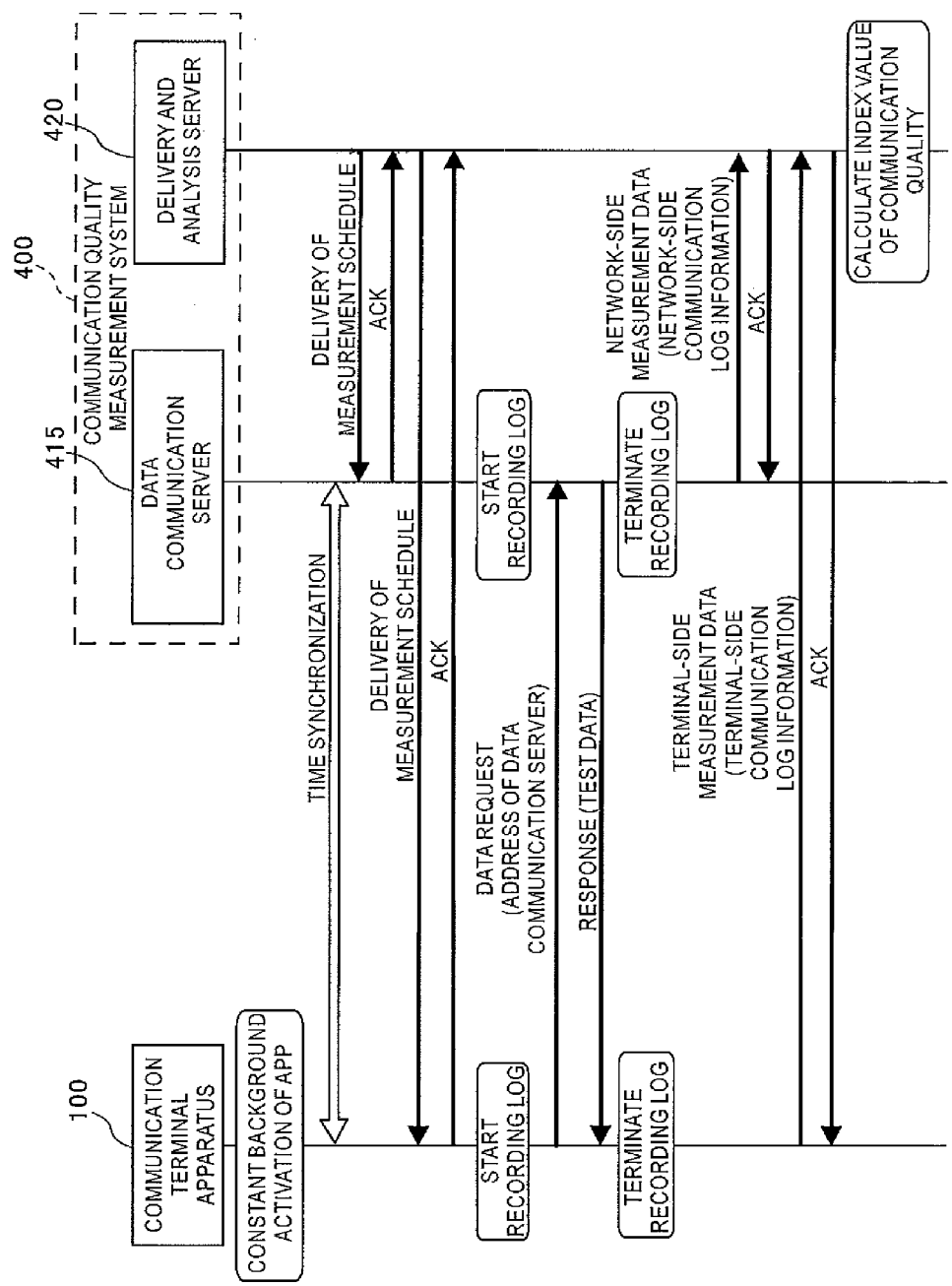
FIG. 4 is a sequence diagram showing one example of communication quality measurements for a data communication in downlink from a data communication server to a communication terminal apparatus in the communication system according to the present embodiment.

FIG. 4 is a sequence diagram showing one example of communication quality measurements for a data communication in downlink from the data communication server 415 to the communication terminal apparatus 100 in the communication system according to the present embodiment. In the present example, a description of the same or substantially the same part as that of the aforementioned example in FIG. 2 will be omitted.

In FIG. 4, to begin with, the delivery and analysis server 420 transmits information of a predetermined measurement schedule to the communication terminal apparatus 100 and the data communication server 415, as the measurement condition defining a timing of communication quality measurement. In the information of measurement schedule, respective addresses of an origination and a destination in an IP network established in the mobile communication network 200 are written as information of the origination and destination, instead of a telephone number.

When it comes to the timing reached near the designated measurement time (10:00 on Nov. 11, 2014), the communication terminal apparatus 100 starts recording a communication log for communication quality measurements based on the information of measurement schedule received from the delivery and analysis server 420.

Furthermore, when it comes to the timing reached near the measurement time (10:00 on Nov. 11, 2014) designated with on the measurement schedule received from the delivery and analysis server 420, the data communication server 415 starts recording a communication log for communication quality measurements. In the data communication server 415, the recording of communication log for communication quality measurements may be constantly performed.

When the foregoing predetermined measurement time (10:00 on Nov. 11, 2014) comes, the communication terminal apparatus 100 performs an automatic uplink communication of transmitting a data request to the address of data communication server 415 designated as the destination by the foregoing measurement schedule, via the mobile communication network 200. The address of data communication server 415 may be set in the communication quality measurement app in advance.

When receiving the data request from the communication terminal apparatus 100, the data communication server 415 transmits a response including the requested test data to the communication terminal apparatus 100 via the mobile communication network 200.

When receiving the response including the test data from the data communication server 415, the communication terminal apparatus 100 terminates recording the communication log. The terminal-side measurement data including the terminal-status log information recorded in the communication terminal apparatus 100 is transmitted to the delivery and analysis server 420.

On the other hand, after transmitting the response including the test data to the communication terminal apparatus 100, the data communication server 415 terminates recording the communication log. The network-side measurement data including the terminal-existing serving-base-station quality information recorded in the data communication server 415 is transmitted to the delivery and analysis server 420.

In the terminal-side measurement data and network-side measurement data of the present example, respective addresses of an origination and a destination in a IP network established in the mobile communication network 200 are written as information of the origination and destination, instead of a telephone number.

When receiving the terminal-side measurement data from the communication terminal apparatus 100 and the network-side measurement data from the data communication server 415, the delivery and analysis server 420 performs a process of communication quality analysis. In this communication quality analysis, for example, the terminal-side measurement data and the network-side measurement data having a mutually equal schedule ID (schedule management number) are collated, and an index of communication quality in the uplink data communication of requesting data from the communication terminal apparatus is calculated. The index value of communication quality calculated herein is, for example, at least one of a connection rate, a (total) failed connection rate, a failure rate of connection (caused by network-side), an out-of-service rate, an airplane-mode rate, an apparatus-failure rate, a power-off rate, a value indicating presence or absence of forcible disconnection (Call Drop), a voice quality value (MOS value) indicating an evaluation result of voice quality and an error rate during communication (block error rate, bit error rate, packet loss rate, etc.) for data communication, which are exemplified in the foregoing Table 6.

As described above, according to the example in FIG. 4, the measurement schedule is delivered from the delivery and analysis server 420 to the communication terminal apparatus 100 and the data communication server 415, as the measurement condition of communication quality measurement for a data communication in downlink from the data communication server 415 to the communication terminal apparatus 100. Consequently, with respect to the data communication in downlink from the data communication server 415 to the communication terminal apparatus 100, the measurement schedule of communication quality measurements can be set or changed easily and optionally, and then, as is the case of example shown in FIGS. 2 and 3, while various communication quality measurements can be performed flexibly, the communication quality can be measured with high accuracy.

Furthermore, according to the example in FIG. 4, it is enough for the communication terminal apparatus 100 to perform a process of recording communication log information during performing a communication for measuring communication quality in accordance with the measurement schedule received from the delivery and analysis server 420. Consequently, load of processing in the communication terminal apparatus 100 can be suppressed compared to a case of constantly recording communication log information in the communication terminal apparatus 100.

Figure 5:
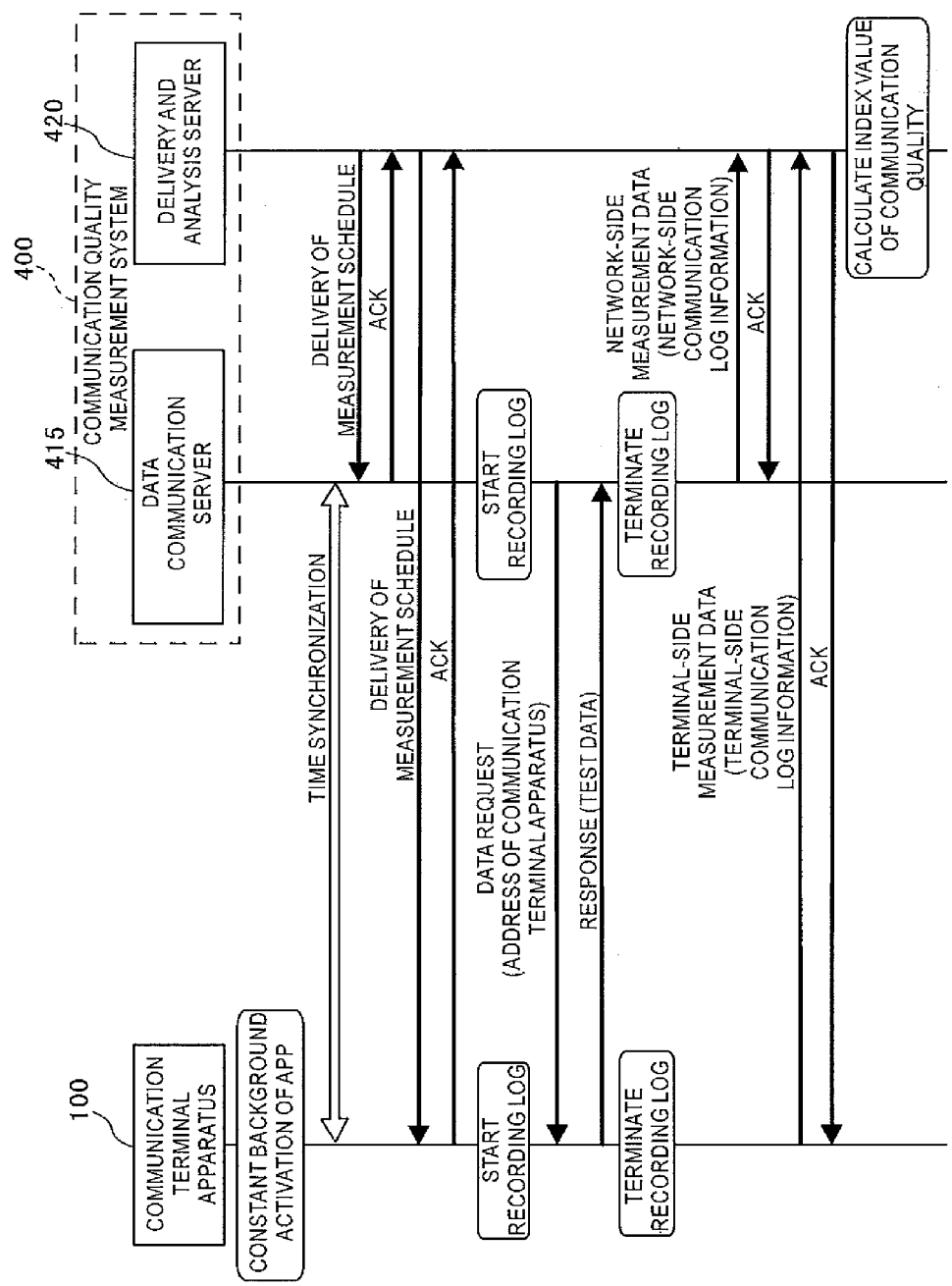
FIG. 5 is a sequence diagram showing one example of communication quality measurements for a data communication in uplink from a communication terminal apparatus to a data communication server in the communication system according to the present embodiment.

FIG. 5 is a sequence diagram showing one example of communication quality measurements for a data communication in uplink from the communication terminal apparatus 100 to the data communication server 415 in the communication system according to the present embodiment. In the present example, a description of the same or substantially the same part as that of the aforementioned examples in FIGS. 2 to 4 will be omitted.

In FIG. 5, after a measurement schedule is delivered and recordings of communication logs for communication quality measurements in the communication terminal apparatus 100 and the data communication server 415 are started, when the foregoing predetermined measurement time (10:00 on Nov. 11, 2014) comes, the data communication server 415 performs an automatic uplink communication of transmitting a data request to the address of communication terminal apparatus 100 designated as the destination by the foregoing measurement schedule, via the mobile communication network 200.

When receiving the data request from the data communication server 415, the communication terminal apparatus 100 transmits a response including the requested test data to the data communication server 415 via the mobile communication network 200.

When receiving the response including the test data from the communication terminal apparatus 100, the data communication server 415 terminates recording the communication log. The network-side measurement data including the terminal-existing serving-base-station quality information recorded in the data communication server 415 is transmitted to the delivery and analysis server 420.

On the other hand, after performing the process of transmitting the response including the test data to the data communication server 415, the communication terminal apparatus 100 terminates recording the communication log. The terminal-side measurement data including of the terminal-status log information recorded in the communication terminal apparatus 100 is transmitted to the delivery and analysis server 420.

As described above, according to the example in FIG. 5, the measurement schedule is delivered from the delivery and analysis server 420 to the communication terminal apparatus 100 and the data communication server 415, as the measurement condition of communication quality measurement for a data communication in uplink from the communication terminal apparatus 100 to the data communication server 415. Consequently, with respect to the data communication in uplink from the communication terminal apparatus 100 to the data communication server 415, the measurement schedule of communication quality measurements can be set or changed easily and optionally, and then, as is the case of example shown in FIGS. 2 to 4, while various communication quality measurements can be performed flexibly, the communication quality can be measured with high accuracy.

Managements and delivery controls of measurement schedules of communication quality in the communication system according to the present embodiment will be then described.

In case of performing measurements of communication quality between the delivery and analysis server 420 and automatic voice response apparatus 410 (or data communication server 415) and the communication terminal apparatus 100, there are the following problems.

For example, the number of communication lines capable of being used at the same time for communication quality measurements in the automatic voice response apparatus 410 (or data communication server 415) is finite and the number of measurements per day, in which communication quality measurements can be performed by establishing a communication lines to each of the communication terminal apparatuses 100, is also finite.

Furthermore, there is a need for requesting to suppress reduction in the number of terminal side measurement data due to a delivery failure of measurement schedule from the delivery and analysis server 420 to the communication terminal apparatus 100.

There is also a need for requesting to acquire the terminal side measurement data with respect to many locations as much as possible where the communication terminal apparatus 100 moves to exist.

In the present embodiment, to solve these problems, the management and delivery of measurement schedule is controlled as shown in the following.

Figure 6:
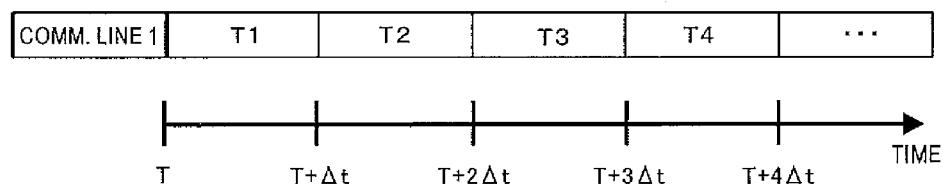
FIG. 6 is a schematic diagram showing one example of measurement-time slots used for managing and controlling measurement schedules of communication quality in the communication system according to the present embodiment.

FIG. 6 is a schematic diagram showing one example of measurement-time slots used for managing and controlling measurement schedules of communication quality in the communication system according to the present embodiment. T in the figure is a time (test starting time) of starting the first measurement of communication quality for a plurality of communication terminal apparatuses and $\Delta T$ is a time interval (test interval) of communication quality measurements.

In the present example, at least one communication line can be used for delivering the measurement schedule of communication quality measurement to the between the plurality of communication terminal apparatuses 100 via the mobile communication network 200. With respect to this communication line (hereinafter called as "communication line 1"), two or more measurement-time slots T1, T2, T3, T4, ... are set, which are continuously arranged at a predetermined period $\Delta T$. This period $\Delta T$ of measurement-time slots is set to have a time (for example, 1 min) corresponding to one measurement of communication quality, by considering a length of test signal used for communication quality measurements and/or a delay time of communication between the automatic voice response apparatus 410 (or data communication server 415) and the communication terminal apparatus 100, etc. The two or more measurement-time slots may be set so as to dividing 24 hours of one day into a plurality of times, or may be set so as to dividing any time period in the 24 hours into a plurality of times. For example, when dividing the 24 hours at a period $\Delta T=1$ min, 1440 consecutive measurement-time slots are set.

According to the example in FIG. 6, managements and controls of measurement schedules of communication quality become simple, by presetting two or more measurement-time slots that can be assigned for communication quality measurements. For example, a control for re-assigning and re-delivering measurement schedules of communication quality shown in the following becomes simple.

Figure 7:
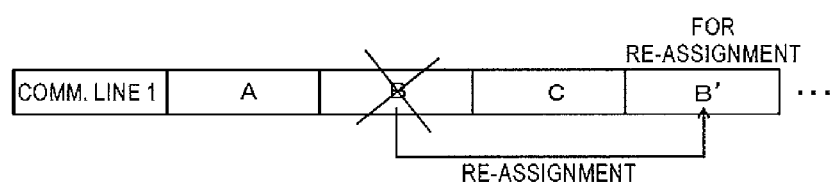
FIG. 7 is a schematic diagram showing one example of re-assigning a measurement schedule when failing in delivering a measurement schedule of communication quality in communication system according to the present embodiment.

FIG. 7 is a schematic diagram showing one example of re-assigning a measurement schedule when failing in delivering a measurement schedule of communication quality in communication system according to the present embodiment.

In the present example, the foregoing measurement-time slots for re-assigning the measurement schedules are preset to a part of the two or more measurement-time slots that are set with respect to the communication line 1. For example, in the example in FIG. 7, measurement schedules A, B and C of three communication terminal apparatuses 100 being targets of communication quality measurements are set to mutually consecutive measurement-time slots T1, T2 and T3. One or more measurement-time slots following the measurement-time slots T1, T2 and T3 are preset as measurement-time slots for re-assigning measurement schedules without using initial settings of measurement schedules.

In the state in which the foregoing measurement-time slots for re-assigning measurement schedules are set, for example, when the delivery of the measurement schedule B is failed without delivering the information of measurement schedule B to the second communication terminal apparatus 100 by the time of measurement-time slot T2 assigned to the measurement schedule B of the second communication terminal apparatus 100, it is controlled as shown in the following. To begin with, with respect to the second communication terminal apparatus 100 to which the measurement schedule information is failed to deliver, a measurement schedule B', in which the measurement time corresponding the communication terminal apparatus is put off, is re-assigned to a measurement-time slot T4 for re-assigning. Then, the measurement schedule B' re-assigned in this way is delivered to the second communication terminal apparatus 100 to which the foregoing measurement schedule B is failed to deliver and the automatic voice response apparatus 410 (or the data communication server 415).

According to the example in FIG. 7, the measurement-time slots for re-assigning the measurement schedules to a part of the two or more measurement-time slots that are set for with respect to the communication line 1 used for communication quality measurements. Therefore, when the delivery of measurement schedule is failed, it is capable of surely delivering the re-assigned measurement schedule to the corresponding communication terminal apparatus 100 and the automatic voice response apparatus 410 (or the data communication server 415). Furthermore, it is capable of acquiring many more measurement data used for the communication quality measurements by re-assigning and re-delivering measurement schedules to the communication terminal apparatuses to which the measurement schedule is failed to deliver.

Figure 8:
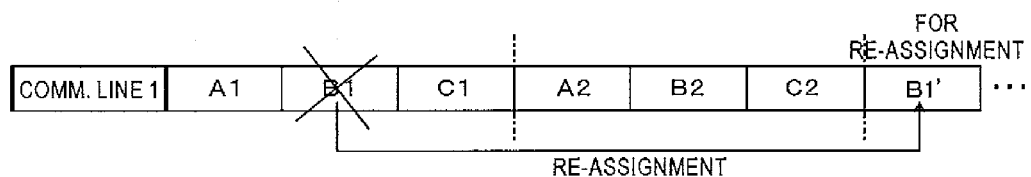
FIG. 8 is a schematic diagram showing another one example of re-assigning a measurement schedule when failing in delivering a measurement schedule of communication quality in communication system according to the present embodiment.

FIG. 8 is a schematic diagram showing another one example of re-assigning a measurement schedule when failing in delivering a measurement schedule of communication quality in communication system according to the present embodiment.

In the present example, measurement schedules for two or more communication terminal apparatuses are assigned to the two or more measurement-time slots repeatedly a plurality of times in the same order as the two or more communication terminal apparatus. For example, in the example of FIG. 8, measurement schedules for three communication terminal apparatuses 100 being targets of communication quality measurements are set repeatedly two times in the same order as the three communication terminal apparatuses. More specifically, measurement schedules A1, B1, C1 and measurement schedules A2, B2, C2 are consecutively set to measurement-time slots T1-T6. Then, one or more measurement-time slots following after this measurement-time slots T1-T6 are preset as measurement-time slots for re-assigning measurement schedules without using the initial setting of measurement schedules. In the example of FIG. 8, a measurement-time slot T7 following after the measurement-time slots T1-T6 is preset as a measurement-time slot for re-assigning measurement schedules without using the initial setting of measurement schedules.

In the state in which the foregoing measurement-time slots for re-assigning measurement schedules are set, for example, when the delivery of the measurement schedule B2 is failed without delivering the information of measurement schedule B2 to the second communication terminal apparatus 100 by the time of measurement-time slot T5 assigned to the measurement schedule B2 of the second communication terminal apparatus 100, it is controlled as shown in the following. To begin with, with respect to the second communication terminal apparatus 100 to which the measurement schedule information is failed to deliver, a measurement schedule B2', in which the measurement time corresponding the communication terminal apparatus is put off, is re-assigned to a measurement-time slot T7 for re-assigning. Then, the measurement schedule B2' re-assigned in this way is delivered to the second communication terminal apparatus 100 to which the foregoing measurement schedule B2 is failed to deliver and the automatic voice response apparatus 410 (or the data communication server 415).

According to the example in FIG. 8, measurement schedules for the same communication terminal apparatus are set so as to being arranged by dispersing them on the entire of two or more measurement-time slots without consecutively arranging measurement schedules for the same communication terminal apparatuses. Therefore, it is capable of measuring communication quality under two or more kinds of measurement condition having mutually different existing location and/or time for the same communication terminal apparatus.

Moreover, according to the example in FIG. 8, as same as the aforementioned example in FIG. 7, the foregoing measurement-time slots for re-assigning the measurement schedules are preset to a part of the two or more measurement-time slots that are set with respect to the communication line 1. Therefore, when the delivery of measurement schedule is failed, it is capable of surely delivering the re-assigned measurement schedules to the corresponding communication terminal apparatus 10 and the automatic voice response apparatus 410 (or the data communication server 415). Further, it is capable of acquiring many more measurement data used for the communication quality measurements by re-assigning and re-delivering measurement schedules to the communication terminal apparatus 100 to which the measurement schedule is failed to deliver.

Figure 9:
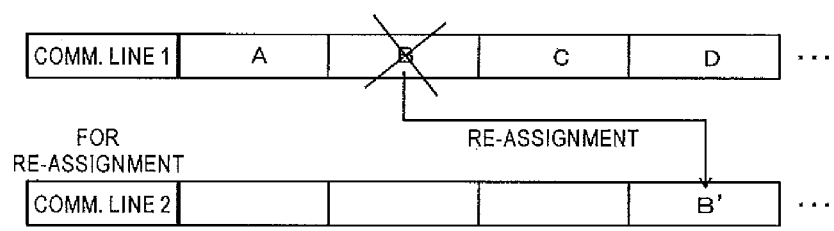
FIG. 9 is a schematic diagram showing yet another one example of re-assigning a measurement schedule when failing in delivering a measurement schedule of communication quality in communication system according to the present embodiment.

FIG. 9 is a schematic diagram showing yet another one example of re-assigning a measurement schedule when failing in delivering a measurement schedule of communication quality in communication system according to the present embodiment.

In the present example, it is capable of using two or more communication lines communication quality measurements between two or more communication terminal apparatuses 100 via the mobile communication network 200. Two or more measurement schedules for measuring communication quality in each of communications with communication terminal apparatuses are assigned so as not to overlap each other to two or more measurement-time slots T1, T2, T3, T4, . . . in a partial communication line ("communication line 1" in the example shown in the figure) of the foregoing two or more communication lines. Other communication line ("communication line 2" in the example shown in the figure) of the foregoing two or more communication lines are used for re-assigning a measurement schedule.

In the state in which the measurement-time slot for re-assigning to the communication line 2, for example, when the delivery of the measurement schedule B is failed without delivering the information of measurement schedule B to the second communication terminal apparatus 100 by the time of measurement-time slot T2 of the communication line 1 which is assigned to the measurement schedule B of the second communication terminal apparatus 100 as shown in FIG. 9, it is controlled as shown in the following. To begin with, with respect to the second communication terminal apparatus 100 to which the measurement schedule B is failed to deliver, a measurement schedule B', in which the measurement time corresponding the communication terminal apparatus is put off, is re-assigned to the measurement-time slot T4 of the communication line 2. Then, the measurement schedule B' re-assigned in this way is delivered to the second communication terminal apparatus 100 to which the foregoing measurement schedule B is failed to deliver and the automatic voice response apparatus 410 (or the data communication server 415).

According to the example in FIG. 9, by using the partial communication line 2 of the two or more communication lines 1 and 2 available for communication quality measurements, as a dedicated communication line for re-assigning a measurement schedule, it is capable of enhancing freedom in re-assigning measurement schedules and re-assigning a measurement schedule close to the original measurement schedule that is failed to deliver. Therefore, it is capable of performing a communication for the communication quality measurement.

Furthermore, according to the example in FIG. 9, a measurement-time slot for re-assigning measurement schedules is preset to the partial communication line 2 of the two or more communication lines 1 and 2 available for communication quality measurements. Therefore, when the delivery of measurement schedule is failed, it is capable of surely delivering the re-assigned measurement schedule to the corresponding communication terminal apparatus 100 and the automatic voice response apparatus 410 (or the data communication server 415). Moreover, it is capable of acquiring many more measurement data used for the communication quality measurements by re-assigning and re-delivering a measurement schedule to the communication terminal apparatus 100 to which the measurement schedule is failed to deliver.

Figure 10:
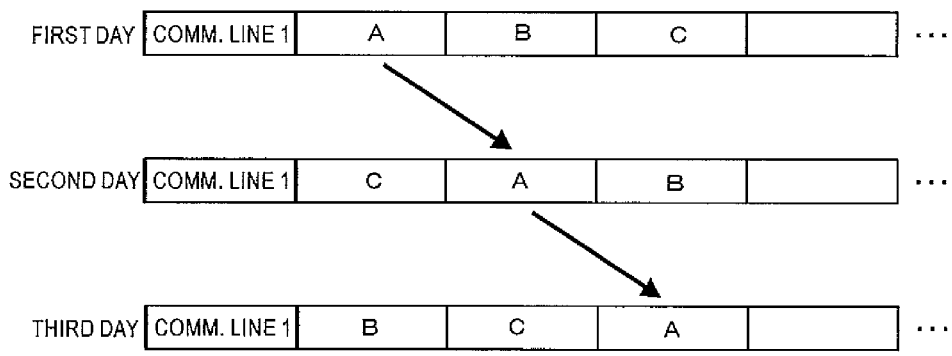
FIG. 10 is a schematic diagram showing one example of assigning a measurement schedule of communication quality in communication system according to the present embodiment.

FIG. 10 is a schematic diagram showing one example of assigning a measurement schedule of communication quality in communication system according to the present embodiment.

A behavior pattern of a user who carries a communication terminal apparatus 100 is fixed to some extent, and there is a high probability that measurement data of communication quality only for the same location even if communication quality measurements for each of the communication terminal apparatuses 100 at the same time everyday. Therefore, with respect to the same communication terminal apparatus 100, the measurement schedule (measurement time) may be shifted so that measurement data of communication quality can be acquired at two or more locations.

For example, as shown in the example of FIG. 10, with respect to each of three communication terminal apparatus 100, the measurement schedule (measurement time) may be shifted at each of predetermined period (for example, for each day). The period to be shifted may not be always constant period but may be changed in optional timing.

Figure 11A:
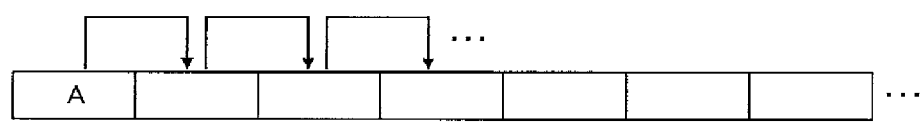
FIG. 11A is a schematic diagram showing one example of shifting a measurement schedule.

Furthermore, the shift amount may be set to an amount corresponding to one or more units of the measurement-time slot. For example, in case of shifting the measurement schedule by an amount corresponding to one unit of measurement-time slot for each day as shown in FIG. 11A, it is capable of measuring the communication quality accurately even when the change of communication quality with time is large. Moreover, in case of shifting the measurement schedule by an amount corresponding to two or more units (three units in the example shown in the figure) of measurement-time slots for each day as shown in FIG. 11B, it is capable of reducing the days for measuring measurement quality up to the latter-half time period in a day.

Further, the shift amount of measurement schedule for the same communication terminal apparatus may be set based on the past measurement schedules at which the communication quality measurements were performed for the same communication terminal apparatus. For example, the measurement schedule for the same communication terminal apparatus may be shifted by skipping the time period of past measurement schedule measured for the same communication terminal apparatus. By this way, it is capable of measuring more efficiently the communication quality for the entire of each time period of a day.

Figure 11B:
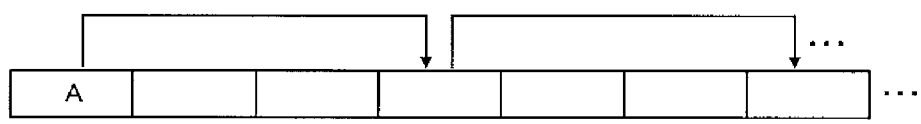
FIG. 11B is a schematic diagram showing another one example of shifting a measurement schedule.

As shown in the foregoing FIGS. 10, 11A and 11B, by shifting the measurement schedule (measurement time) for the same communication terminal apparatus, it is capable of collecting efficiently communication quality measurement data at various locations.

It is noted that, although the examples in FIGS. 7-10, 11A and 11B shows the cases in which the number of communication terminal apparatuses 100 to be measured for communication quality measurements is three, the number of communication terminal apparatuses 100 to be measured for communication quality measurements may be one or two, or may be more than four.

Furthermore, the management and control of measurement schedule of communication quality exemplified in FIGS. 6-10, 11A and 11B can be similarly applied to not only measurements of voice quality (for example, MOS value) in voice communications but also measurements of other various kinds of communication quality (for example, connection rate)

It is noted that, although the index of communication quality is calculated by using both of the terminal-side measurement data and the network-side measurement data in the aforementioned embodiments, the index of communication quality may be calculated by using either one of the terminal-side measurement data and the network-side measurement data.

Moreover, the communication terminal apparatus 100 and network-side apparatuses (the automatic voice response apparatus 410 and the data communication server 415) may record and create the communication log and perform the communication quality measurements, in accordance with a similar policy (rule) of measurement schedule. For example, a time (start time of measurement) of starting a communication quality measurement may be determined, the communication log may be recorded and created and the communication quality measurement may be performed, based on a measurement schedule for repeating the communication quality measurement at regular time intervals (for example 1 hour) from the start time of measurement.

It is noted that process steps and configuration elements in each of the communication terminal apparatus 100, the automatic voice response apparatus 410, the data communication server 415, the delivery and analysis server 420, etc. described in the present specification can be implemented with various means as well as the aforementioned means. For example, these process steps and configuration elements may be implemented with hardware, firmware, software, or a combination thereof.

With respect to hardware implementation, means such as processing units or the like used for establishing the foregoing steps and configuration elements in entities (for example, various wireless communication apparatuses, Node B, server, gateway, switching equipment, computer, hard disk drive apparatus, or optical disk drive apparatus) may be implemented in one or more of an application-specific IC (ASIC), a digital signal processor (DSP), a digital signal processing device (DSPD), a programmable logic device (PLD), a field programmable gate array (FPGA), a processor, a controller, a microcontroller, a microprocessor, a electronic device, other electronic unit, computer, or a combination thereof, which are designed so as to perform a function described in the present specification.

With respect to the firmware and/or software implementation, means such as processing units or the like for establishing the foregoing configuration elements may be implemented with a program (for example, a code such as a procedure, a function, a module, an instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may be executed by a computer or processor.

The description of embodiments disclosed in the present specification is provided so that the present disclosures can be produced or used by those skilled in the art. Various modifications of the present disclosures will be readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST 100 communication terminal apparatus
200 mobile communication network
210 base station
300 fixed-telephone network
400 communication quality measurement system
410 automatic voice response apparatus
415 data communication server
420 delivery and analysis server
500 Internet
510 access-point apparatus
600 contents providing server
610 NTP server

The invention claimed is:

1. A method of measuring communication quality, comprising:
setting two or more measurement-time slots with respect to a communication line used for communication quality measurements in communication with two or more communication terminal apparatuses via a mobile communication network, each of the two or more measurement-time slots having a time corresponding to one measurement of communication quality, and the two or more measurement-time slots being continuously arranged at a predetermined period;
assigning two or more measurement schedules for measuring communication quality in each of communications with the two or more communication terminal apparatuses to the two or more measurement-time slots;
delivering information of the measurement schedule for each of the two or more communication terminal apparatuses to each of the communication terminal apparatuses;
performing a communication for the communication quality measurement with the communication terminal apparatus corresponding to the measurement schedule via the communication line when the time of measurement schedule comes;
presetting a measurement-time slot for re-assigning the measurement schedule to a part of the forgoing two or more measurement-time slots;
re-assigning the measurement schedule for the communication terminal apparatus to the measurement-time slot for re-assigning when the delivery of the measurement schedule information is failed without delivering the measurement schedule information to the communication terminal apparatus by the time of measurement schedule; and delivering information of the re-assigned measurement schedule to the communication terminal apparatus to which the measurement schedule information is failed to deliver.

2. The method according to claim 1, further comprising:
assigning the measurement schedules for the two or more communication terminal apparatuses to the two or more measurement-time slots repeatedly a plurality of times in the same order as the two or more communication terminal apparatus.

3. The method according to claim 2, further comprising:
shifting the measurement schedule for the communication terminal apparatus so as to be assigned to distinct measurement-time slot at each predetermined period.

4. The method according to claim 1, further comprising:
shifting the measurement schedule for the communication terminal apparatus so as to be assigned to distinct measurement-time slot at each predetermined period.

5. A method of measuring communication quality, comprising:
setting two or more measurement-time slots with respect to a communication line used for communication quality measurements in communication with two or more communication terminal apparatuses via a mobile communication network, each of the two or more measurement-time slots having a time corresponding to one measurement of communication quality, and the two or more measurement-time slots being continuously arranged at a predetermined period;
assigning two or more measurement schedules for measuring communication quality in each of communications with the two or more communication terminal apparatuses to the two or more measurement-time slots;
delivering information of the measurement schedule for each of the two or more communication terminal apparatuses to each of the communication terminal apparatuses;
performing a communication for the communication quality measurement with the communication terminal apparatus corresponding to the measurement schedule via the communication line when the time of measurement schedule comes;
setting two or more measurement-time slots with respect to each of two or more communication lines used for communication quality measurements in communication with two or more communication terminal apparatuses via the mobile communication network, each of the two or more measurement-time slots having a time corresponding to one measurement of communication quality, and the two or more measurement-time slots being continuously arranged at a predetermined period;
assigning two or more measurement schedules for measuring communication quality in each of communications with the two or more communication terminal apparatuses to the two or more measurement-time slots in a part of the two or more communication lines;
re-assigning the measurement scheduled for the communication terminal apparatus to the measurement-time slot for re-assigning in other part of the two or more communication lines when the delivery of the measurement schedule information is failed without delivering the measurement schedule information to the communication terminal apparatus by the time of measurement schedule; and delivering information of the re-assigned measurement schedule information to the communication terminal apparatus to which the measurement schedule information is failed to deliver.

6. The method according to claim 5, further comprising:

assigning the measurement schedules for the two or more communication terminal apparatuses to the two or more measurement-time slots repeatedly a plurality of times in the same order as the two or more communication terminal apparatus.

7. The method according to claim 6, further comprising:

shifting the measurement schedule for the communication terminal apparatus so as to be assigned to distinct measurement-time slot at each predetermined period.

8. The method according to claim 5, further comprising:

shifting the measurement schedule for the communication terminal apparatus so as to be assigned to distinct measurement-time slot at each predetermined period.

9. A system of measuring communication quality, comprising:

means of setting two or more measurement-time slots with respect to a communication line used for communication quality measurements in communication with two or more communication terminal apparatuses via a mobile communication network, each of the two or more measurement-time slots having a time corresponding to one measurement of communication quality, and the two or more measurement-time slots being continuously arranged at a predetermined period;

means of assigning two or more measurement schedules for measuring communication quality in each of communications with the two or more communication terminal apparatuses to the two or more measurement-time slots;

means of delivering information of the measurement schedule for each of the two or more communication terminal apparatuses to each of the communication terminal apparatuses;

means of performing a communication for the communication quality measurement with the communication terminal apparatus corresponding to the measurement schedule via the communication line when the time of measurement schedule comes;

means of presetting a measurement-time slot for re-assigning the measurement schedule to a part of the forgoing two or more measurement-time slots;

means of re-assigning the measurement schedule for the communication terminal apparatus to the measurement-time slot for re-assigning when the delivery of the measurement schedule information is failed without delivering the measurement schedule information to the communication terminal apparatus by the time of measurement schedule; and means of delivering information of the re-assigned measurement schedule to the communication terminal apparatus to which the measurement schedule information is failed to deliver.

10. The system according to claim 9, further comprising:

means of assigning the measurement schedules for the two or more communication terminal apparatuses to the two or more measurement-time slots repeatedly a plurality of times in the same order as the two or more communication terminal apparatus.

11. The system according to claim 10, further comprising means of shifting the measurement schedule for the communication terminal apparatus so as to be assigned to distinct measurement-time slot at each predetermined period.

12. The system according to claim 9, further comprising:

means of shifting the measurement schedule for the communication terminal apparatus so as to be assigned to distinct measurement-time slot at each predetermined period.

13. A system of measuring communication quality, comprising:

means of setting two or more measurement-time slots with respect to a communication line used for communication quality measurements in communication with two or more communication terminal apparatuses via a mobile communication network, each of the two or more measurement-time slots having a time corresponding to one measurement of communication quality, and the two or more measurement-time slots being continuously arranged at a predetermined period;

means of assigning two or more measurement schedules for measuring communication quality in each of communications with the two or more communication terminal apparatuses to the two or more measurement-time slots;

means of delivering information of the measurement schedule for each of the two or more communication terminal apparatuses to each of the communication terminal apparatuses;

means of performing a communication for the communication quality measurement with the communication terminal apparatus corresponding to the measurement schedule via the communication line when the time of measurement schedule comes;

means of setting two or more measurement-time slots with respect to each of two or more communication lines used for communication quality measurements in communication with two or more communication terminal apparatuses via the mobile communication network, each of the two or more measurement-time slots having a time corresponding to one measurement of communication quality and the two or more measurement-time slots being continuously arranged at a predetermined period;

means of assigning two or more measurement schedules for measuring communication quality in each of communications with the two or more communication terminal apparatuses to the two or more measurement-time slots in a part of the two or more communication lines;

means of re-assigning the measurement schedule for the communication terminal apparatus to the measurement-time slot for re-assigning in other part of the two or more communication lines when the delivery of the measurement schedule information is failed without delivering the measurement schedule information to the communication terminal apparatus by the time of measurement schedule; and means of delivering information of the re-assigned measurement schedule to the communication terminal apparatus to which the measurement schedule information is failed to deliver; and means of delivering information of the re-assigned measurement schedule to the communication terminal apparatus to which the measurement schedule information is failed to deliver.

14. The system according to claim 13, further comprising:
means of assigning the measurement schedules for the two or more communication terminal apparatuses to the two or more measurement-time slots repeatedly a plurality of times in the same order as the two or more communication terminal apparatus.

15. The system according to claim 14, further comprising:
means of shifting the measurement schedule for the communication terminal apparatus so as to be assigned to distinct measurement-time slot at each predetermined period.

16. The system according to claim 13, further comprising:
means of shifting the measurement schedule for the communication terminal apparatus so as to be assigned to distinct measurement-time slot at each predetermined period.

* * * * *